United States Patent [19] [11] 3,838,263
Haeusler et al. [45] Sept. 24, 1974

[54] ANALOG FUNCTION GENERATOR WITH MAGNETIC CARRIER

[75] Inventors: Jochen Haeusler, Nurnberg-Laufamholz; Wolfgang Wagnerberger; Michael Appiah, both of Nurnberg, all of Germany

[73] Assignee: Siemens Aktiengesellschaft, Munich, Germany

[22] Filed: Nov. 22, 1972

[21] Appl. No.: 308,779

[30] Foreign Application Priority Data
Nov. 22, 1971 Germany............................ 2157801

[52] U.S. Cl................. 235/197, 323/94 H, 324/167
[51] Int. Cl............................................... G06g 7/26
[58] Field of Search .......... 235/197, 184, 193, 178, 235/186; 323/194 H; 324/167, 173, 174, 179

[56] References Cited
UNITED STATES PATENTS

| 2,832,052 | 4/1958 | Heartz | 235/178 X |
|---|---|---|---|
| 3,162,805 | 12/1964 | Robertson | 235/197 X |
| 3,317,829 | 5/1967 | Kuhrt et al. | 235/197 UX |
| 3,366,909 | 1/1968 | Hini et al. | 323/94 H X |

Primary Examiner—Joseph F. Ruggiero
Attorney, Agent, or Firm—Kenyon & Kenyon Reilly Carr & Chapin

[57] ABSTRACT

An analog function generator is disclosed and has a magnetic carrier made up of at least two magnetic parts extending over a predetermined range. The magnetic parts have respective, mutually opposing polarities and develop a composite magnetic field composed of component magnetic induction fields corresponding to these polarities. The magnetic parts conjointly define a common boundary interface between each other. A galvanomagnetic device such as a Hall generator is disposed in the composite magnetic field. The magnetic carrier and the galvanomagnetic device are mounted so as to effect a relative motion with respect to each other and the interface is inclined with respect to the direction of this motion; this causes the component magnetic fields to act upon the galvanomagnetic device in respective varying intensities as the device and the carrier move relative to each other in the direction of the relative motion whereby the device provides an output signal having a polarity and magnitude dependent upon the position of the device with respect to the carrier.

5 Claims, 5 Drawing Figures

PATENTED SEP 24 1974  3,838,263

ANALOG FUNCTION GENERATOR WITH MAGNETIC CARRIER

BACKGROUND OF THE INVENTION

The invention relates to an analog function generator having a magnetic carrier and a galvanomagnetic device. An output signal is obtained which has a magnitude and polarity dependent upon the position of the device and the carrier relative to each other. According to a preferred embodiment of the invention, an output signal is obtained that is dependent upon an angle of rotation.

Function generators which are dependent on the angle of rotation are required in measurement, control and regulating technology, among which the angle-position transmitters which provide a trigonometric or linear representation of the angle are the most important. In the control and regulation of drive arrangements, the problem frequently arises wherein it is required to bring rotating shafts to a standstill in a predetermined angular position. Digital angle step transmitters are disclosed in Siemens—Zeitschrift Vol. 36, No. 7, pages 521 to 527 (1962), Siemens—Zeitschrift Vol. 38, No. 9, pages 673 to 675 (1964) and Maschinenmarkt Vol. 70, No. 75, pages 122 to 124 (1964). These digital angle step transmitters are suited for this task only conditionally because the digital-to-analog conversion required for positioning fails with decreasing speed of rotation; this conversion utilizes digital angle signals from which there is derived a signal for the analog drive. For accurate positioning which is associated with a reduction of the speed to zero, an analog angle transmitter is necessary.

SUMMARY OF THE INVENTION

It is an object of the invention to provide an analog function generator wherein the signal is taken-off without contact and is proportional to position.

It is another object of the invention to provide such an analog function generator which provides an output signal dependent upon an angle of rotation. Subsidiary to this object, it is an object of the invention to provide an analog function generator for generating an angle dependent function over a range of 360° and especially a signal proportional to angular position.

The analog function generator according to the invention has as a feature a magnetic carrier made up of at least two magnetic parts extending over a predetermined range. The magnetic parts have respective, mutually opposing polarities and develop a composite magnetic field comprising respective component magnetic induction fields corresponding to these polarities. The magnetic parts conjointly define a common boundary interface between each other. A galvanomagnetic device is disposed in the composite magnetic field. The magnetic carrier and the galvanomagnetic device are mounted so as to effect a relative motion with respect to each other. The interface is inclined with respect to the direction of the relative motion to cause the component magnetic fields to act upon the galvanomagnetic device in respective varying intensities as the device and the carrier move relative to each other in the direction of the relative motion whereby the device provides an output signal having a polarity and magnitude dependent upon the position of the device with respect to the carrier.

A preferred embodiment of the analog function generator provides an output signal which is a function of angular position. This embodiment includes a support member and the magnetic parts are attached thereto so as to extend over an angular range between 0° and 360°. The support member is rotatably mounted to rotate the magnetic parts in an angular direction with respect to the galvanomagnetic device; this causes the component magnetic fields to act upon the galvanomagnetic device in respective varying intensities as the magnetic parts move in the angular direction whereby the output signal has a polarity and magnitude dependent upon the angular position of the support member.

The common boundary interface between the oppositely polarized parts of the magnetic carrier preferably has a slope over its entire length and the galvanomagnetic device is associated with the magnetic carrier in such a manner that the composite magnetic field caused by the boundary interface acts upon the device during one revolution of the magnetic carrier.

The galvanomagnetic device can be, for example, a Hall generator which takes off signals without making contact with the carrier. As described above, the galvanomagnetic device is acted upon by the magnetic field of the magnetic carrier.

The magnetic carrier can be, for example, a rectangular magnetic foil consisting of two parts of respective opposite polarities; these parts are arranged on the circumference of a circular carrier and the boundary interface between these parts ascends linearly. The interface thus is of constant slope. In another embodiment, the magnetic carrier can consist of two parts of respective opposite polarities in the form of a circular magnetic foil which is arranged on the end face of a circular carrier. The two oppositely polarized parts of the magnetic carrier are mutually separated along an approximately spiral-shaped common boundary interface.

The known digital function generators are equipped with Hall generators which move, as far as possible, perpendicularly to the boundary surface between oppositely magnetized regions. In contrast thereto, the analog function generator of the invention wherein the output signal is dependent on the angle of rotation provides that the Hall generator is led gradually over the boundary interface over a large angular range or during one revolution. It therefore operates in the inhomogeneous field of the boundary region.

Although the invention is illustrated and described herein as an analog function generator, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

Embodiments of the analog function generator according to the invention are illustrated in the following FIGS. described below. Similar components are designated by the same reference numeral in each FIG. in which they appear.

DESCRIPTION OF THE PREFERRED EMBODIMENTS OF THE INVENTION

Figure 1A:
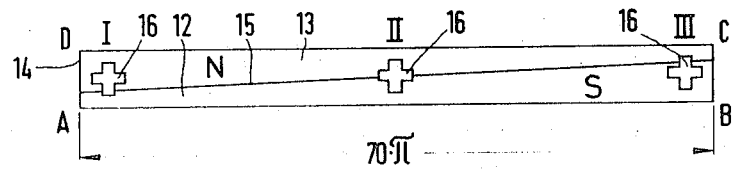
FIG. 1a is a schematic diagram of an analog function generator wherein the boundary interface between the parts of the magnetic carrier extends linearly and slopes with respect to the direction of motion.
Figure 1B:
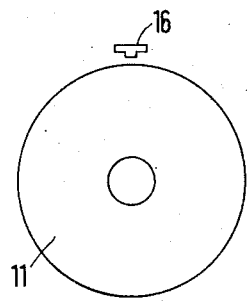
FIGS. 1b and 1c show the analog function generator of FIG. 1a configured to provide an output signal dependent upon angular rotation.
Figure 1C:
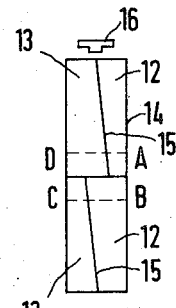

FIG. 1a illustrates schematically a plan view of the analog function generator wherein a magnetic carrier 14 and a galvanomagnetic device are arranged so as to effect a relative motion between each other. According to a preferred embodiment of the invention, this configuration can be arranged as a linear analog function generator wherein the generator output is dependent upon an angle of rotation. The magnetic carrier forms part of the generator and consists of two oppositely polarized parts and is arranged on the periphery of a circular carrier 11 as shown in FIGS. 1b and 1c.

The analog function generator dependent upon angle of rotation then consists of a wheel-shaped carrier 11 which serves as the carrier of a magnetizable foil 14 consisting of at least two oppositely polarized parts 12 and 13. FIG. 1a can be considered as showing the foil 14 in a plane. For generating a Hall voltage which is proportional to the angle of rotation from 0° to 360°, the rectangular, divided foil 14 is divided so that for a length of, for example, 70πmm, the linearly rising boundary interface 15 between the oppositely magnetized halves 12 and 13 is inclined so that it extends through the center of the rectangle ABCD and through the sides BC and AD so as to be displaced from the center by 1 millimeter in each instance. Immediately to the right of the side AD the Hall generator 16 (Position I) is penetrated by positive induction. If the Hall generator moves toward the center, its effective area is penetrated increasingly also by negative induction, until both are of equal intensity in the center of the rectangle (Position II). In this position the Hall generator gives the signal 0. If it moves further in the direction toward the side CB, it is penetrated to an even greater degree by negative induction, until it finally delivers the largest negative signal at Position III. If the two-part magnet carrier 14 is situated on the circumference of the wheel-shaped carrier 11 as shown in FIGS. 1b and 1c, the edges CB and AD butt against each other and the induction changes sign abruptly at this point. If the rectangle ABCD is divided by a straight line which intersects the sides AB and CD at a height of 2.5 and 4 mm, respectively, a signal voltage can be obtained which is practically proportional to the angle between 0° and 360° if the scanning is done on a straight line which intersects on both sides at a height of about 5 mm.

Figure 2:
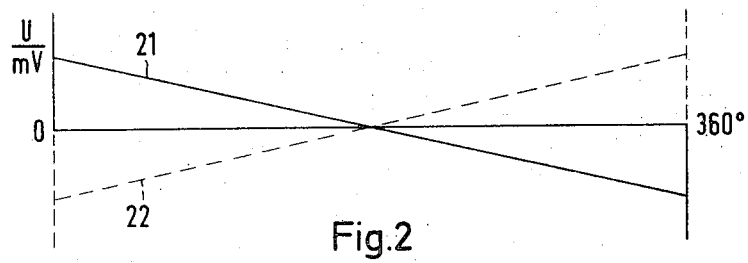
FIG. 2 is a graphic presentation of the curve of the signal voltage delivered by the Hall generator in a function generator according to FIGS. 1a to 1c.

The signal voltage delivered by the Hall generator 16 is shown graphically in FIG. 2. On the abscissa is plotted the range of angles from 0° to 360° and on the ordinate, the transmitted signal voltage U in millivolts. The curve 21 represents the plot of the signal voltage per revolution of the magnet carrier 14. By reversing the control voltage of the Hall generator, a signal voltage curve can be obtained which is given by the broken-line curve 22.

Figure 3:
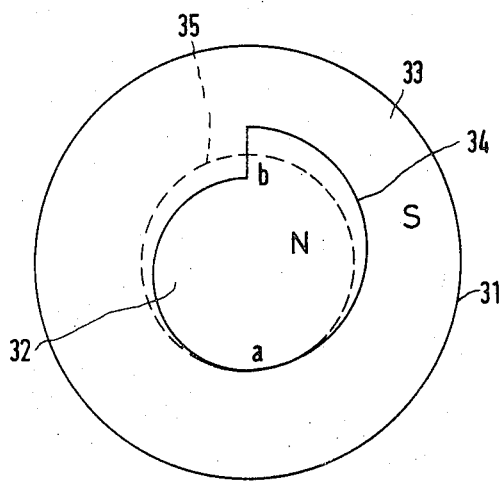
FIG. 3 is a schematic diagram of a function generator according to the invention wherein an approximately spiral-shaped boundary interface between the oppositely polarized parts of the magnetic carrier is provided.

The same curve of the signal voltage according to FIG. 2 can be obtained also if the magnetizable foil is applied to the end face of a wheel-shaped carrier instead of the circumference. In this embodiment, a magnetic carrier is used as shown schematically in FIG. 3. The magnetic carrier 31 consists of the two oppositely polarized parts 32 and 33. The two parts 32 and 33 are separated along the approximately spiral-shaped, rising boundary curve 34. One part of the curve 34 is situated within, and the other part outside of the circle 35 described by the Hall generator during scanning. The circle 35 intersects the curve 34 at the point a and at the point b on the straight line portion. At the point of intersection a the signal voltage exhibits a gradual zero crossing corresponding to Position II in FIG. 1a. At the intersection point b, the signal voltage exhibits a steep zero crossing.

What is claimed is:

1. An analog function generator comprising a magnetic carrier made up of at least two magnetic parts extending over a predetermined range, said magnetic parts having respective, mutually opposing polarities and developing a composite magnetic field comprising respective component magnetic induction fields corresponding to said polarities, said magnetic parts conjointly defiing a common boundary interface between each other, and a galvanomagnetic device disposed in said composite magnetic field, said magnetic carrier and said galvanomagnetic device being mouned so as to effect a relative motion between each other, said interface being inclined with respect to the direction of said motion to cause said component magnetic fields to act upon said galvanomagnetic device in respective varying intensities as said device and said carrier move relative to each other in said direction of said relative motion whereby said device provides an output signal having a polarity and magnitude dependent upon the position of said device with respect to said carrier.

2. The analog function generator of claim 1 wherein the output signal is a function of angular position, said function generator comprising a support member, said magnetic parts being attached to said support member so as to extend over an angular range between 0° and 360°, said support member being rotatably mounted to rotate said magnetic parts in an angular direction with respect to said galvanomagnetic device to cause said component magnetic fields to act upon said galvanomagnetic device in respective varying intensities as said magnetic parts move in said angular direction whereby said output signal has a polarity and intensity dependent upon the angular position of said support member.

3. The analog function generator of claim 2, said galvanomagnetic device being a Hall generator.

4. The analog function generator of claim 3, said support member being a circular member, said magnetic carrier being a rectangular magnetic foil attached to the circumferential periphery of said circular member, said two magnetic parts being respective foil portions having respective, mutually opposing polarities, said foil portions conjointly defining a common boundary interface between each other, said boundary interface having a constant slop so as to rise linearly with respect to the direction of angular motion.

5. The analog function generator of claim 3, said support member being a circular member, said magnetic carrier being a circular magnetic foil attached to an end face of said circular member, said two magnetic parts being respective foil portions having respective, mutually opposing polarities, said foil portions conjointly defining a common boundary interface between each other, said boundary interface having a spiral-like shape.

* * * * *